United States Patent
Tanaka et al.

(10) Patent No.: US 9,325,946 B2
(45) Date of Patent: Apr. 26, 2016

(54) CONTENT PROCESSING APPARATUS AND METHOD, AND PROGRAM

(75) Inventors: Kazumasa Tanaka, Kanagawa (JP); Kenji Tanaka, Kanagawa (JP); Yoshihiro Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/635,059

(22) PCT Filed: Mar. 30, 2011

(86) PCT No.: PCT/JP2011/058021
§ 371 (c)(1),
(2), (4) Date: Sep. 14, 2012

(87) PCT Pub. No.: WO2011/125743
PCT Pub. Date: Oct. 13, 2011

(65) Prior Publication Data
US 2013/0011120 A1    Jan. 10, 2013

(30) Foreign Application Priority Data

Apr. 9, 2010    (JP) ................................ 2010-090607

(51) Int. Cl.
*H04N 9/80*    (2006.01)
*H04N 7/173*    (2011.01)
(Continued)

(52) U.S. Cl.
CPC ........ *H04N 7/17318* (2013.01); *G06F 17/3084* (2013.01); *G06F 17/30256* (2013.01); *G06F 17/30802* (2013.01); *G11B 27/105* (2013.01); *G11B 27/28* (2013.01); *G11B 27/34* (2013.01);
(Continued)

(58) Field of Classification Search
CPC ........................................................ H04N 9/80
USPC ............................................ 386/241, E9.011
See application file for complete search history.

(56) References Cited

U.S. PATENT DOCUMENTS 5,537,528 A    7/1996    Takahashi et al.
7,409,145 B2 *  8/2008   Antoun et al. ................ 386/248
(Continued)

FOREIGN PATENT DOCUMENTS

CN         1637923        7/2005
CN         101286166      10/2008
(Continued)

OTHER PUBLICATIONS

Video Studio 12 Plus, COREL, Aug. 31, 2008.
(Continued)

*Primary Examiner* — Thai Tran
*Assistant Examiner* — Nien-Ru Yang
(74) *Attorney, Agent, or Firm* — Frommer Lawrence & Haug LLP; WIlliam S. Frommer

(57) ABSTRACT

Metadata including information identifying scene change points is extracted from a moving image. Representative images, which are still images corresponding to the identified scene change points of the content, are extracted from the moving image. A timeline of the content is displayed, and indications of the locations and durations of scenes identified by the scene change points are displayed. Thumbnails of the representative images are displayed at time positions associated with the content timeline; and the location in a scene of a representative image is displayed with an identifying characteristic that identifies the corresponding thumbnail.

6 Claims, 13 Drawing Sheets

(51) Int. Cl.

| | | |
|---|---|---|
| *G06F 17/30* | (2006.01) | |
| *G11B 27/10* | (2006.01) | |
| *G11B 27/28* | (2006.01) | |
| *G11B 27/34* | (2006.01) | |
| *H04N 21/234* | (2011.01) | |
| *H04N 21/482* | (2011.01) | |
| *H04N 21/81* | (2011.01) | |
| *H04N 21/84* | (2011.01) | |
| *H04N 9/82* | (2006.01) | |

(52) U.S. Cl.
CPC ....... *H04N 9/8227* (2013.01); *H04N 21/23418* (2013.01); *H04N 21/4828* (2013.01); *H04N 21/8153* (2013.01); *H04N 21/84* (2013.01)

(56) References Cited

U.S. PATENT DOCUMENTS

| | | | |
|---|---|---|---|
| 2005/0084232 A1* | 4/2005 | Herberger et al. | 386/4 |
| 2005/0235335 A1* | 10/2005 | Morita et al. | 725/133 |
| 2005/0244137 A1* | 11/2005 | Takashima et al. | 386/69 |
| 2007/0074244 A1 | 3/2007 | Miyamori | |
| 2007/0162953 A1* | 7/2007 | Bolliger et al. | 725/142 |
| 2008/0256450 A1 | 10/2008 | Takakura et al. | |
| 2008/0263448 A1* | 10/2008 | Oppenheimer | 715/719 |

FOREIGN PATENT DOCUMENTS

| | | |
|---|---|---|
| EP | 1513151 | 3/2005 |
| EP | 1 818 933 | 8/2007 |
| JP | 7-67073 | 3/1995 |
| JP | 2001-238154 | 8/2001 |
| JP | 2003-333484 | 11/2003 |
| JP | 2005-80027 | 3/2005 |
| JP | 2010-28184 | 2/2010 |
| KR | 10-2005-0024240 | 3/2005 |
| WO | WO 2005/050986 | 6/2005 |

OTHER PUBLICATIONS

Search Report issued in corresponding European application No. 11765643.9 dated Feb. 19, 2014.

Office Action issued in corresponding Chinese application No. 201180017234.1 issued Sep. 17, 2014 and the English Translation.

* cited by examiner

CONTENT PROCESSING APPARATUS AND METHOD, AND PROGRAM

TECHNICAL FIELD

The present invention relates to a content Processing apparatus and method, and a program, and in particular, relates to a content processing apparatus and method, and a program capable of grasping the details of moving image content more easily.

BACKGROUND ART

In recent years, a technique of retrieving and analyzing video (moving image) content has been suggested. When displaying the results of such an analysis and a retrieval, a display method which is easy to understand visually such as not only displaying just a numerical value, an image or the like, but also for example, displaying a timeline display of content has been developed.

In other words, a predetermined replay time is necessary because it is necessary to replay the content in order to check all of the details of the moving image content. Thus, it is preferable to be able to grasp the details of content easily without taking the replay time.

In the related art, an exemplary display of an image of waveform such as a change in a voice signal or in the brightness of a pixel has been known as the timeline display.

In addition, a method which displays an image of a first frame and an image of a last frame of each scene constituting content or the like, or a technique which makes it possible to view image digest scenes on multi-screens have been also suggested. (see, for example, Patent Document 1).

In addition, there has been proposed a technique in which an index moving image with a lower frame rate than the normal video is recorded at the same time as the normal moving image, and when a user selects any of images displayed for index, for example, a replay of the index moving image about the selected moving image is performed (see, for example, Patent Document 2).

CITATION LIST

Patent Documents

Patent Document 1: Japanese Patent Application Laid-Open No. 7-67073
Patent Document 2 Japanese Patent Application Laid-Open No. 2001-238154

SUMMARY OF THE INVENTION

Problems to be Solved by the Invention

However, in the related art, there is a problem in that it is not possible for a user to easily find a scene that contains a desired image or seek a desired feature scene easily.

For example, it is not possible to compare a time ratio at which a portion in which a plurality of images are displayed sequentially or a desired image is displayed in the content, with a time ratio at which. other images are displayed, although content can be retrieved as each image of which is retrieved individually.

In addition, in the method of displaying, for example, images of a leading frame of scene, display becomes complicated in a case of temporally long content, and a user is unlikely to easily recognize the details of the content from such a display.

Furthermore, it is difficult to grasp what kind of images exist on which portion (time position) of video content in a case of a method of displaying index images on a multi-screen or a method of replaying index moving images.

The invention has been made in view of such circumstances and an object of the invention is to more easily grasp the details of the moving image content.

Solutions to Problems

An aspect of the present invention is a content processing apparatus including: metadata extracting means that extracts a representative image which is a still image and metadata including information for specifying a frame corresponding to the representative image from input content of a moving image; and timeline display means that generates display data for displaying the content in the timeline based on the metadata, wherein the timeline display means displays a thumbnail of the representative image in association with a time position of a frame of the representative image among the content along With the content displayed in the timeline, when the displaying of the thumbnail of the representative image is instructed.

The metadata may include information of a scene change point of the content, and based on the metadata, the timeline display means may specify scenes constituting the content, display the content in the timeline by displaying a figure which indicates each of the scenes corresponding to a time length of the scene, using a horizontal or vertical direction of a screen as a time axis, and display the thumbnail of the representative image in connection to a part of the figure.

The timeline display means may display the figure that indicates a figure in a color of representing the scene specified by a predetermined method to display the content in the timeline.

The timeline display means may replay the content and display a moving image at a predetermined position of the screen, and display a slider for specifying a position of a replayed frame in the content on a time axis, in a case where the replay of the content displayed in the timeline is instructed.

The timeline display means may change an aspect of displaying the thumbnail corresponding to the representative image in a case where the position on the time axis specified by the slider becomes the position of the frame of the representative image.

The timeline display means may generate display data for displaying a screen having a representative image display region for displaying a list of the representative images, a moving image display region for displaying the moving image of the replayed content, and a timeline display region for displaying the content in the timeline along with the thumbnail.

An aspect of the present invention is a content processing method including: extracting a representative image which is a still image and metadata including information for specifying a frame corresponding to the representative image from input content of a moving image by metadata extracting means; and generating display data for displaying the content in timeline based on the metadata by timeline display means, wherein a thumbnail of the representative image corresponding to a time position of a frame of the representative image among the content is displayed along with the content displayed the timeline, in a case where displaying of the thumbnail of the representative image is instructed.

An aspect of the present invention is a program for causing a computer to function as a content processing apparatus, the content processing apparatus including: metadata extracting means that extracts metadata which includes a representative image which is a still image and information of specifying a frame corresponding to the representative image from input content of a moving image; and timeline display means that generates display data for displaying the content in timeline based on the metadata, wherein the timeline display means displays a thumbnail of the representative image in association with a time position of a frame of the representative image among the content along with the content displayed in the timeline, when the displaying of the thumbnail of the representative image is instructed.

According to an aspect of the invention, from content of a moving image being input, a representative image which is a still image and metadata including information of specifying a frame corresponding to the representative image are extracted. Based on the metadata, display data for displaying the content in a timeline is generated, and in a case where displaying of a thumbnail of the representative image is instructed, the thumbnail for the representative image corresponding to a time position of a frame of the representative image among the content is displayed along with the content displayed in the timeline.

EFFECTS OF THE INVENTION

According to the invention, it is possible to more easily grasp the details of the moving image content.

MODE FOR CARRYING OUT THE INVENTION

Embodiments of the invention will be described below with reference to the drawings.

Figure 1:
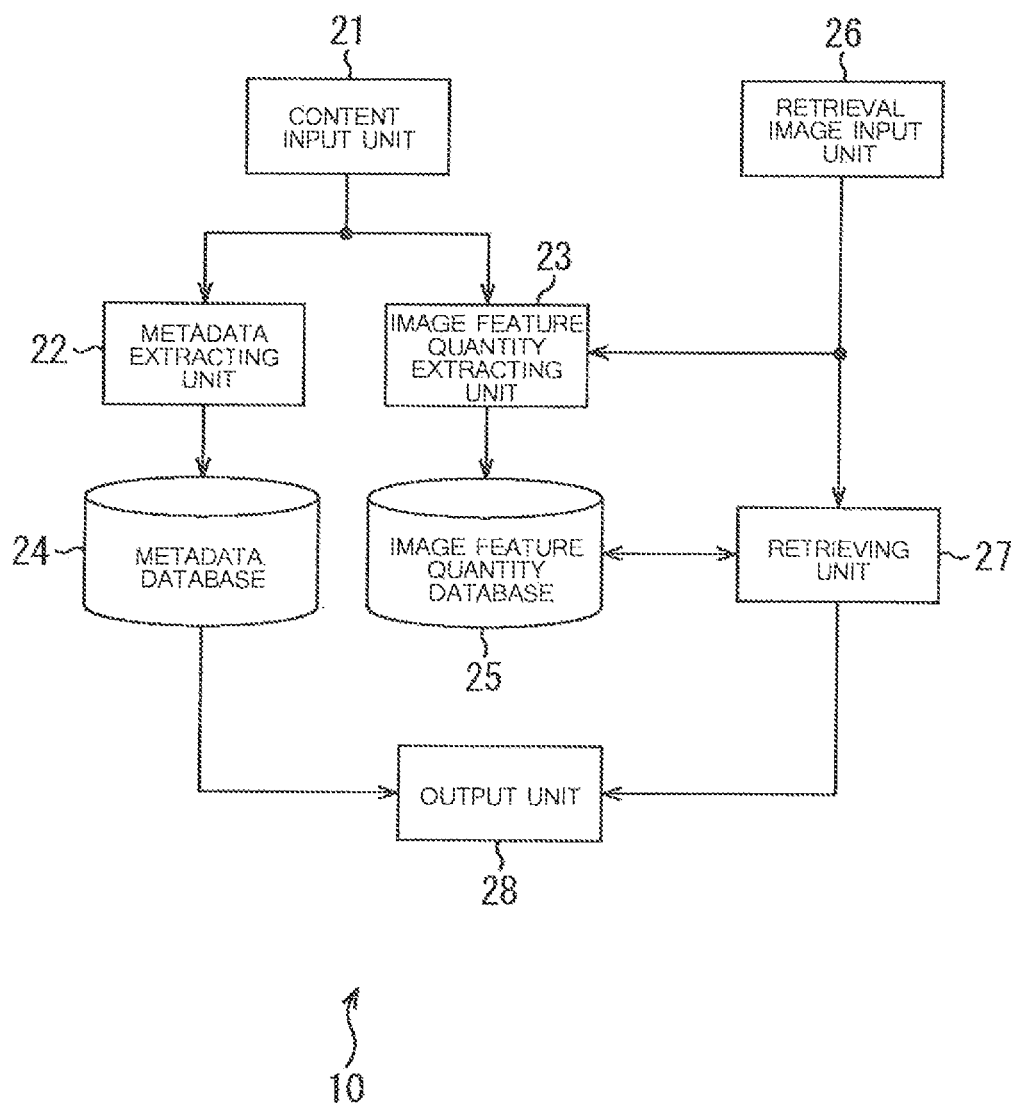
FIG. 1 is a block diagram illustrating an exemplary configuration of a content processing apparatus according to an embodiment of the invention.

FIG. 1 shows a block diagram illustrating an exemplary configuration of a content processing apparatus according to an embodiment of the invention.

The content processing apparatus 10 displays content of an input moving image in the timeline and retrieves a predetermined image from among the content as necessary, and displays the retrieval results in timeline.

As shown in FIG. 1, the content processing apparatus provided with a content input unit 21, a metadata extracting unit 22, an image feature quantity extracting unit 23, a metadata database 24 and an image feature quantity database 25. In addition, the content processing apparatus 10 is provided with a retrieval image input unit 26, a retrieving unit 27 and an output unit 28.

The content input unit 21 receives the input of the data of content. The content is content of the moving image and also includes a sound or a caption as necessary as described above. The content includes content edited as part of broadcasted programs and the like, for example.

The metadata extracting unit 22 is configured to analyze the data of content supplied from the content input unit 21, and to extract the metadata from the content. For example, here, the metadata includes information such as information about a scene change point of content, information about the time to be required when displaying in the timeline to be mentioned later, and information about the representative image of the content.

The representative image of content included in the metadata is, for example, an image (still image) of a frame corresponding to a scene where the level of an audio signal becomes largest among each of scenes that make up the content, and the representative images are extracted in a predetermined manner. Information such as the representative image data and a frame number of the frame corresponding to the representative image is also extracted by the metadata extracting unit.

It is configured so that the metadata having been extracted by the metadata extracting unit is stored, for example, in a metadata database 24 while being associated with the identification, information of the content.

In addition, the image feature quantity extracting unit 23 is configured to analyze the data of content supplied from the content input unit 21, and to extract the image feature quantity from the content. Here, the image feature quantity is information used to obtain the similarity degree comparing between retrieval images in the processing of the retrieving unit 27 which will be described later. The image feature quantity is such information that for example, a still image for one frame that constitutes content is divided into a predetermined plurality of regions, and each of the divided regions describes the representative color. In addition, for example, the image feature quantity may be information of histogram of the pixel values of a still image for one frame.

The image feature quantity extracted by the image feature quantity extracting unit 23 is, for example, stored in the image feature quantity database 25 while being associated with the identification information of the content and the frame number.

In addition, the image feature quantity extracting unit 23 is configured to extract the image feature quantity in the same manner from the retrieval image input from the retrieval image input unit 26.

The retrieval image input unit 26 is configured to receive the input of the retrieval image that is a still image. The retrieval image, for example, is an image arbitrarily selected by a user and is input to retrieve an image similar to the retrieval image from among content input from the content input unit 21.

The retrieving unit 27 compares the retrieval image feature quantity extracted by the image feature quantity extracting unit 23 with the image feature quantity stored in the image feature quantity database 25 by a predetermined method. Thereby, a similarity degree comparing the image feature quantity of the retrieval image and the image feature quantity of each of the still image for one frame constituting content that is stored in the image feature quantity database 25 is calculated as a numeral value.

The retrieving unit 27, for example, specifies still images having the image feature quantity, the similarity degree of which has become equal to or more than a predetermined threshold comparing with the image feature quantity of the retrieval image, and supplies the frame numbers of those still images to the output unit 28.

The output unit 28 is configured to read the metadata of content from the metadata database 24, and to generate the display data Which becomes necessary for displaying in the timeline about the content.

In addition, the output unit 28 reads the metadata of the content from the metadata database 24 and, based on the frame numbers of the still images supplied from the retrieving unit 27 and the read metadata, generates the display data for displaying the retrieval results in the timeline.

In addition, the display data that is output from the output unit 28 supplied to the display or the like (not shown)and is displayed as an image described below.

Next, an example of timeline display of content by the content processing apparatus 10 will be described.

Figure 2:
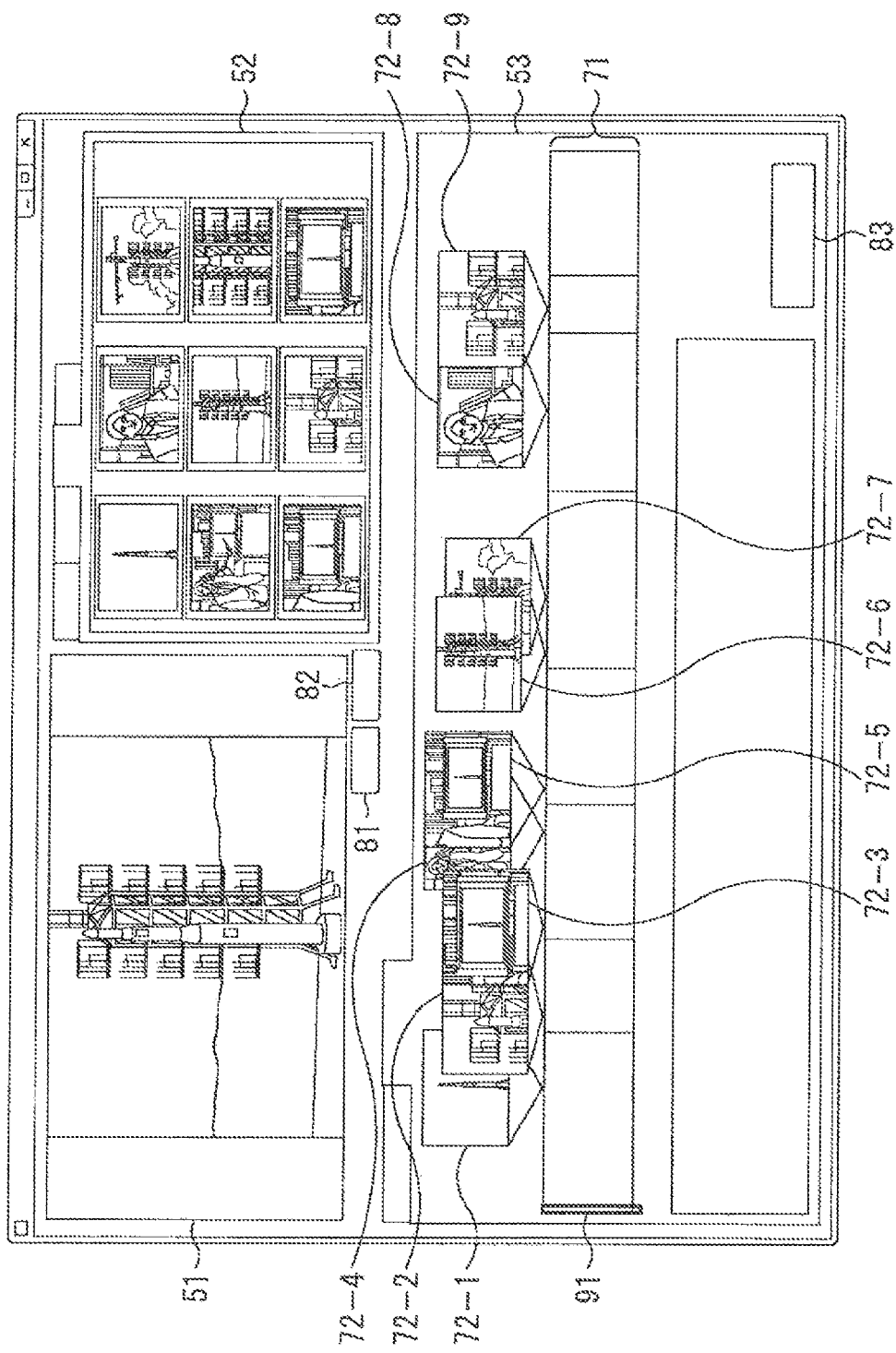
FIG. 2 is a diagram illustrating an exemplary screen displayed based on display data output from an output unit of FIG. 1.

FIG. 2 is a diagram illustrating an exemplary screen displayed on the display or the like (not shown) based on the display data output from the output unit 28.

The screen shown in FIG. 2 has a moving image display region 51. An image of content input from the content input unit 21 is displayed as a moving image on the moving image display region 51.

In addition, the screen shown in FIG. 2 has a representative image display region 52. On the representative image display region 52, the representative image included in the metadata that is read from the metadata database 24 is displayed as a still image. In this example, 9 (=3×3) representative images are displayed.

Furthermore, the screen shown in FIG. 2 has a timeline display region 53. The content is displayed in the timeline in the timeline display region 53 so that the horizontal direction in the drawing corresponds to the time of the content. In other words, the content is displayed. corresponding to the time axis so that the left side end of the timeline display region 53. corresponds to a start time of the content, and the right side end of the timeline display region 53 corresponds to a termination time of the content.

Herein, displaying so that a user can recognize visually predetermined content as the time length of the content, an inside scene of the content, and a time position of a frame or the like is referred to as a timeline display of content. In addition, the timeline display of content displays the content by any one of methods, but, for example, does not mean that content is replayed and displayed as a moving image. The display of content in the timeline display means that a figure, a wave pattern, a sign and the like that symbolize content or the component of the content are displayed corresponding to a time axis, for example.

The timeline display region 53 includes a scene display region 71. In the scene display region each scene of content is displayed as a rectangle having a width (length) corresponding to the time length of each scene. In other words, in the scene display region 71, eight rectangles are displayed, indicating that the content is constructed by eight scenes. In addition, start and termination points of each scene are specified based on the information of the scene change point included in the metadata read from the metadata database 24 and a rectangle of the scene display region 71 is displayed.

Each rectangle to be displayed in the scene display region 71 is displayed as a white rectangle for convenience in the drawing, but, for example, is displayed with a representative color of each scene. The representative color of the scene is specified for example, as color and the like corresponding to the greatest pixel value among pixel values of all frames existing in the scene. In addition, a representative color of the scene may be specified by methods other than this method, as long as a color suitable for the impression of the scene becomes a representative color.

On the upper side of the scene display region 71 in the drawing, representative images are displayed respectively. In other words, nine representative images displayed at the representative image display region 52 are displayed each at the position corresponding to the frame number in each of content.

In other words, the representative image displayed in a first line and first row of the representative image display region 2 is an image of the frame included in the first scene of content, and is displayed as a thumbnail 72-1 on the upper side of the scene display region 71. In addition, dotted lines indicating the position of the frame are given to the thumbnail 72-1 toward a leftmost rectangle of the scene display region 71 in the drawing.

Herein, a time position of the frame of the thumbnail 72-1 is indicated by a dotted line being pulled toward one point at slightly left from an upper side center of the leftmost rectangle of the scene display region 71 in the drawing from the left end and right end of the thumbnail 72-1 in the drawing. In other words, it indicates that the representative image displayed in the first line and first row of the representative image display region 52 is the image of the frame at the position corresponding to one point at slightly left from a center of the leftmost rectangle of the scene display region 71 on time axis in the drawing. In this manner, the user can easily grasp the time position in the content of the representative image.

In addition, it may be displayed by a different method as long as it is possible to indicate the position of the frame of the representative image of each thumbnail. The important thing is that in order to be able to grasp the time position of the representative image in content, the thumbnail may be displayed while being associated with content displayed in a timeline.

In addition, each thumbnail may be generated based on data of a frame of a representative image, and also may be generated in advance and included in the metadata.

A thumbnail 72-2 is intended to represent the representative image that is displayed on the second row and third column of the representative image display region 52, indicating that the thumbnail represents an image of the frame included in the second scene of the content.

A thumbnail 72-3 represents a representative image displayed on the third row and third column of the representative image display region 52, indicating that the thumbnail represents an image of the frame included in the third scene of content.

Similarly, thumbnails 72-4 to 72-9 are displayed, and a thumbnail indicating each of nine representative images to be displayed on the representative image display region 52 is displayed on the upper side of the scene display region 71.

In addition, each of the thumbnails is, for example, displayed in an alternately overlapped manner. For example, the thumbnail 72-2 is superimposed on, and partially hides, the thumbnail 72-1. In addition, when the thumbnails are displayed in an overlapped manner, for example, a thumbnail on top is displayed in transparency of 50% so that a thumbnail, displayed below in an overlapped manner can be seen through.

In addition, for example, buttons 81 to 83 which are shown in FIG. 2 are constituted as components of a GUI. For example, by operating the button 83, the thumbnails 72-1 to 72-9 can be displayed respectively on the upper side of the scene display region 71. In other words, a screen shown in FIG. 2 is displayed first without the thumbnails 72-1 to 72-9 displayed, and when the button 83 is operated, the thumbnails 72-1 to 72-9 are displayed respectively on the upper side of the scene display region 71.

The button 81 is for replaying content and displaying a moving image on the moving image display region 51. The button 82 is for stopping the replay of the content.

In the case where content is replayed by the button 81, the position of a frame currently replayed is shown by a slider 91 on the timeline display region 53.

Figure 3:
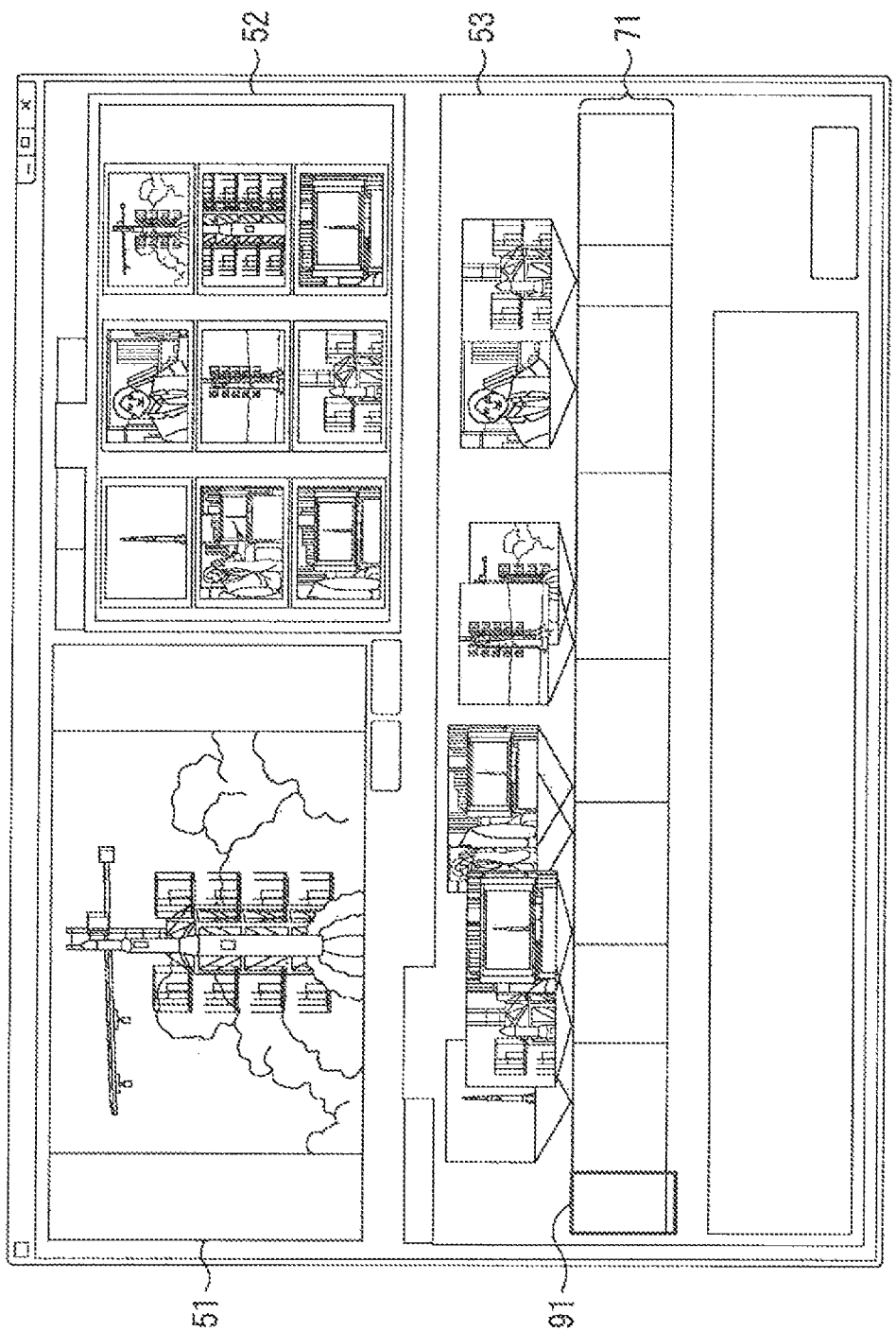
FIG. 3 is a diagram illustrating an exemplary screen of When content is replayed on the screen shown in FIG. 2.

FIG. 3 is a diagram illustrating an example of the screen of when the button 81 is operated to replay the content and then a predetermined period of time has elapsed, in the screen shown in FIG. 2.

The slider 91 is, for example, a red quadrangular frame displayed in overlapped manner on the scene display region 71, and is displayed so that horizontal-direction length increases in the drawing over time. The right end Of the slider 91 will express the current replay position of content. The right end of the slider 91 has moved to the tight side on the scene display region 71 according to a scheduled time having passed after content is replayed as shown in FIG. 3.

Figure 4:
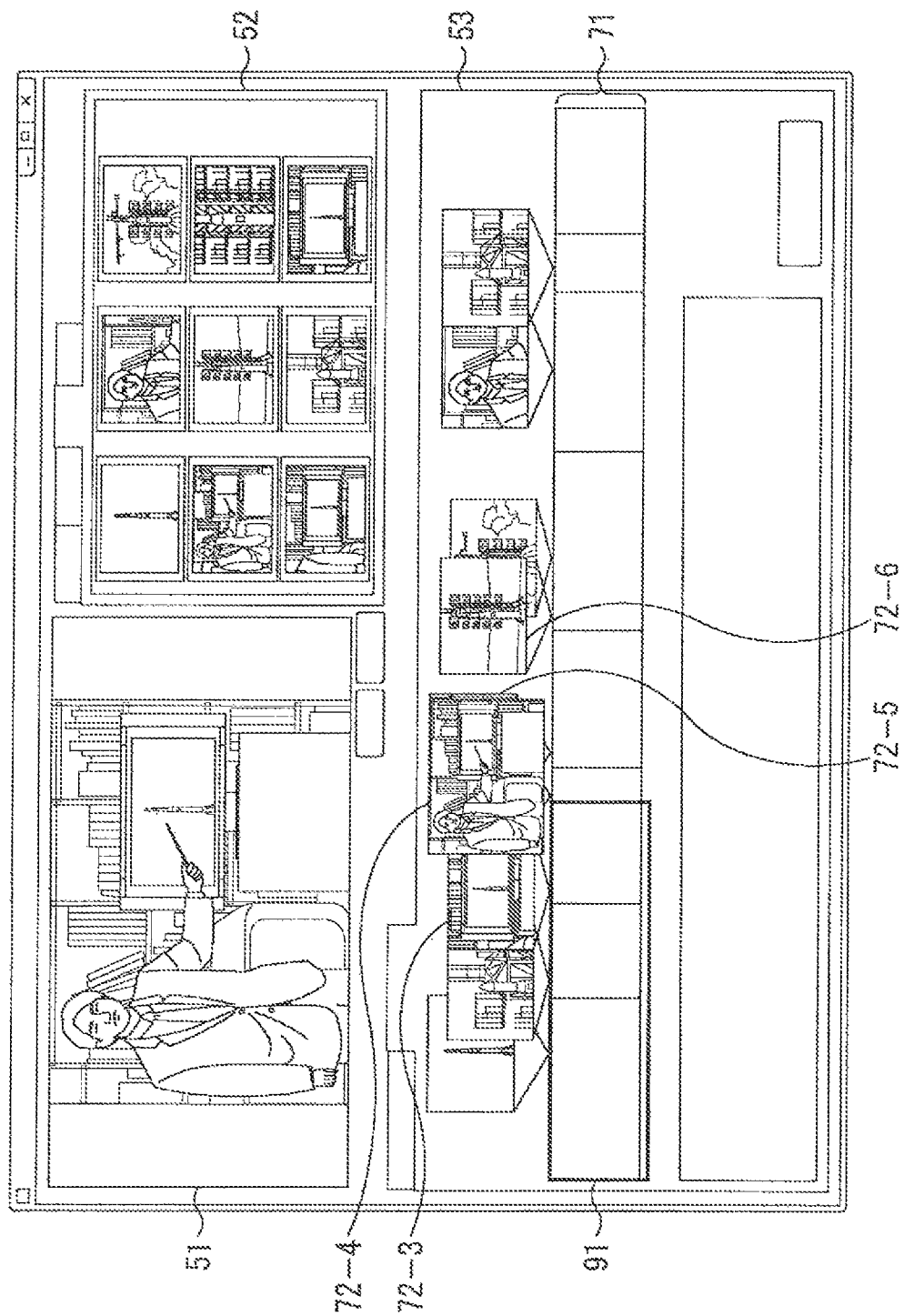
FIG. 4 is a diagram illustrating an exemplary screen of when some time has further passed from the state shown in FIG. 3.

FIG. 4 is a diagram illustrating an example of the screen of when more time has passed from a state shown in FIG. 3. Over time as shown in the same drawing, the right end of the slider 91 has moved to the further right side on the scene display region 71 and coincides with the position of the frame of the representative image corresponding to the thumbnail 72-4. The thumbnail 72-4 is to express the representative image displayed on the second row and first column Of the representative image display region 52, and an image displayed on the moving image display region 51 in FIG. 4 coincides with a representative image displayed in the second row and first column of representative image display region 52

At this time, the thumbnail 72-4 is expanded and displayed so that a display area thereof becomes larger than those of other thumbnails. In addition, at this time, the thumbnail 72-4 is displayed while being overlapped on top of the thumbnails 72-3 and 72-5 and displayed with transparency of 0%. In other words, the thumbnail 72-4 will he displayed so that the thumbnails 72-3 and 72-5 cannot be seen through.

In this way, when a replay position (the right end of the slider 91) coincides with the position of the frame of the representative image, a thumbnail indicating the representative image is emphasized and displayed. Here, an example has been described in which the display area of the thumbnail is expanded and emphasized by being displayed in an overlapped manner on top with transparency of 0%, but aspect of the display of the thumbnail may be changed by other methods.

In this way, according to the invention, it is possible to display the details of content clearly in timeline. Because a thumbnail for expressing each scene of content and a representative image is displayed along a time axis in the timeline display region 53, the user is enabled to grasp in advance when and what kind of scene can be seen when replaying the content concerned.

Furthermore, for example, the user pays attention to a representative image and can evaluate the superiority and inferiority of the editing of the content concerned because each thumbnail is highlighted and displayed on the timeline display region 53 sequentially when the position of the right end of the slider 91 moves when replaying content.

Figure 5:
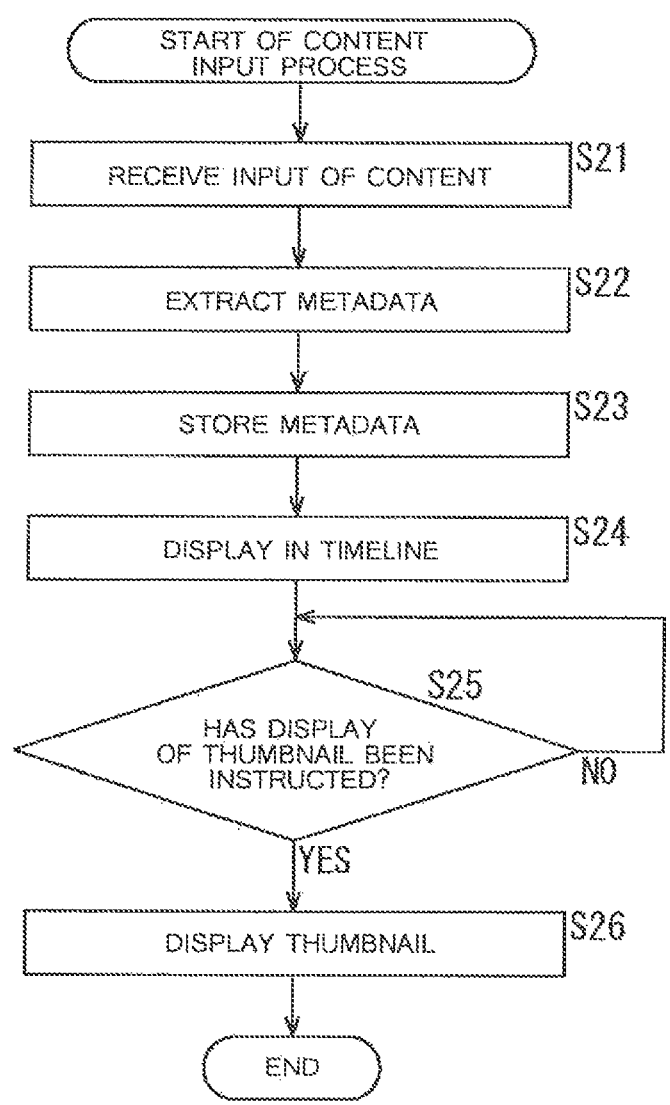
FIG. 5 is a flowchart for explaining an exemplary content displaying process.

Then, an example of the content displaying process by the content processing apparatus 10 of FIG. 1 will be described with reference to the flowchart of FIG. 5.

In step S21, the content input unit 21 receives the input of the data of content.

In step S22, the metadata extracting unit 22 analyzes the data of content supplied from the content input unit 21, and extracts the metadata from content. At this time, for example, information such as the information about the scene change point of content, information about the time to be required when displaying in a timeline and the representative image of the content is extracted as the metadata.

Note that as for the representative image of the content included in the metadata, a representative image is extracted by a predetermined method. The data of the representative image and the information such as the frame number of the frame corresponding to the representative image are extracted by the metadata extracting unit, too.

In step S23, the metadata database 24 stores the metadata extracted by processing of step S22.

In step S24, the output unit 28 reads the metadata of content from the metadata database 24, and generates the display data which becomes necessary to display the content in the timeline. In this way, the screen mentioned above with reference to FIG. 2 is displayed. Note that, as described above, the screen shown in FIG. 2 is displayed first without the thumbnails 72-1 to 72-9 displayed.

In step S25, the output unit 28 determines whether the display of the thumbnail, has been instructed and waits until it is determined that the display of the thumbnail has been instructed.

For example, when the button 83 of FIG. 2 is operated, it is determined in step S25 that the display of the thumbnail has been instructed, and the processing advances to step S26.

In step S26 the output unit 28 generates the display data necessary to display a thumbnail on the screen corresponding to display data generated in step S24. In this way, for example, the thumbnails 72-1 to 72-9 are displayed respectively on the upper side of the scene display region 71.

As such, the content displaying process is performed.

Thereafter, to display the Screen as shown in FIGS. 3 and 4 in response to operation of the GUI on the screen, the output unit 28 generates the display data for displaying those screens appropriately.

Then, the retrieval of the image by the content processing apparatus 10 will be described.

As described above, the retrieval image input unit 26 is configured to receive the input of the retrieval image which is a still image. The retrieval image, for example, is an image arbitrarily selected by a user and is input to retrieve an image similar to the retrieval image concerned from the content input from the content input unit 21.

Figure 6:
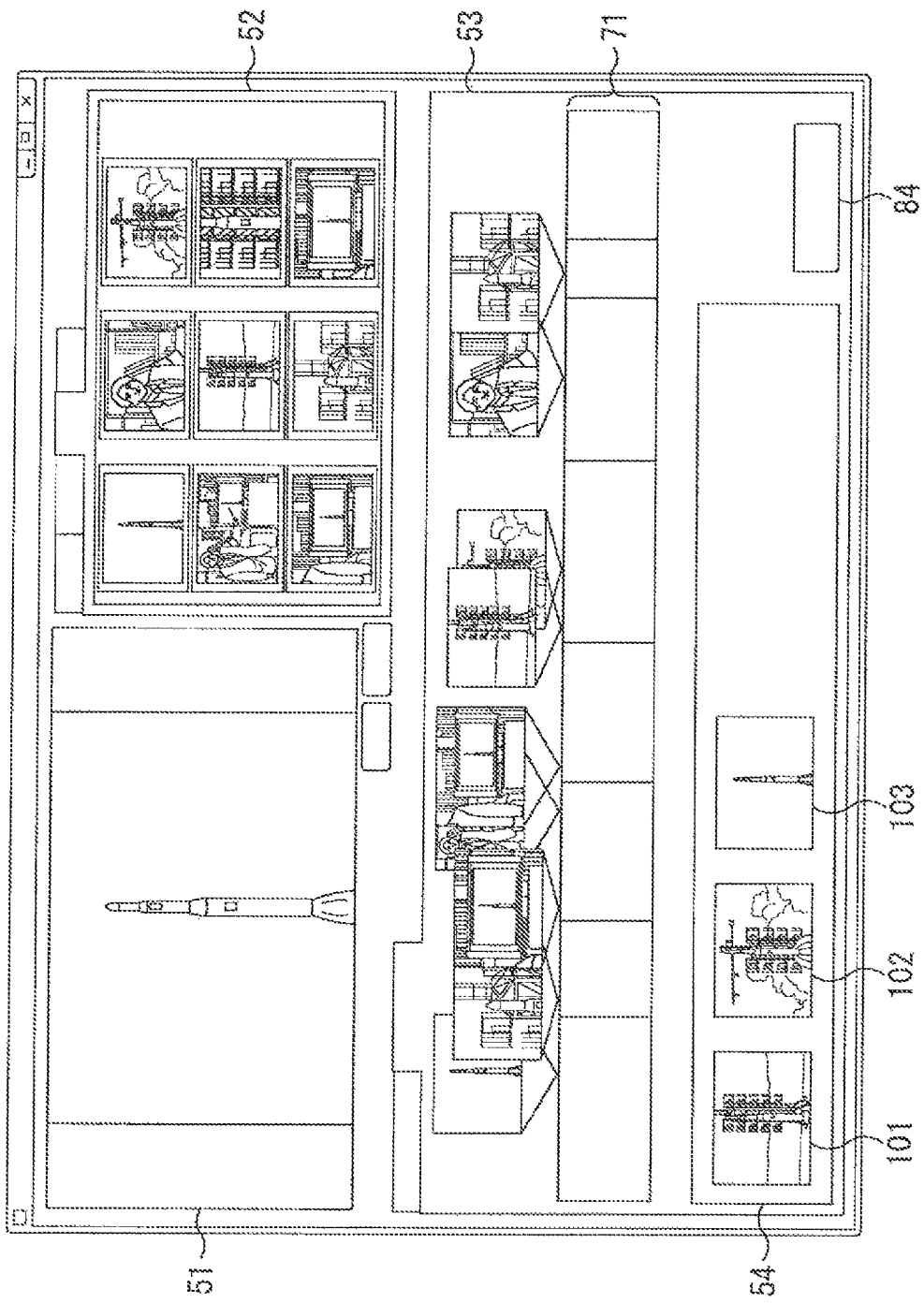
FIG. 6 is a diagram illustrating an example where a retrieval is Performed on the screen of FIGS. 2 to 4.

For example, an example where a retrieval is performed in the screen mentioned above with reference FIGS. 2 to 4 is illustrated in FIG. 6. The figure shows an example where retrieval images are retrieved from the same content as the content in FIGS. 2 to 4.

In the screen of FIG. 6, the retrieval image display region 54 is provided, on which images 101 to 103 which are retrieval images input through the retrieval image input unit 26 are displayed. In this example, three representative images are selected as retrieval images from nine representative images displayed on the representative image display region 52.

In other words, an image displayed in second row and second column among images displayed on the representative image display region 52 is the image 101, and an image displayed in the first row and third column among the images displayed on the representative image display region 52 is the image 102, and an image displayed in first row and first column among the images displayed on representative image display region 52 is the image 103.

By operating the button 84 in this state, an image having a high similarity degree to an image displayed on the retrieval image display region 54 is retrieved from content.

Figure 7:
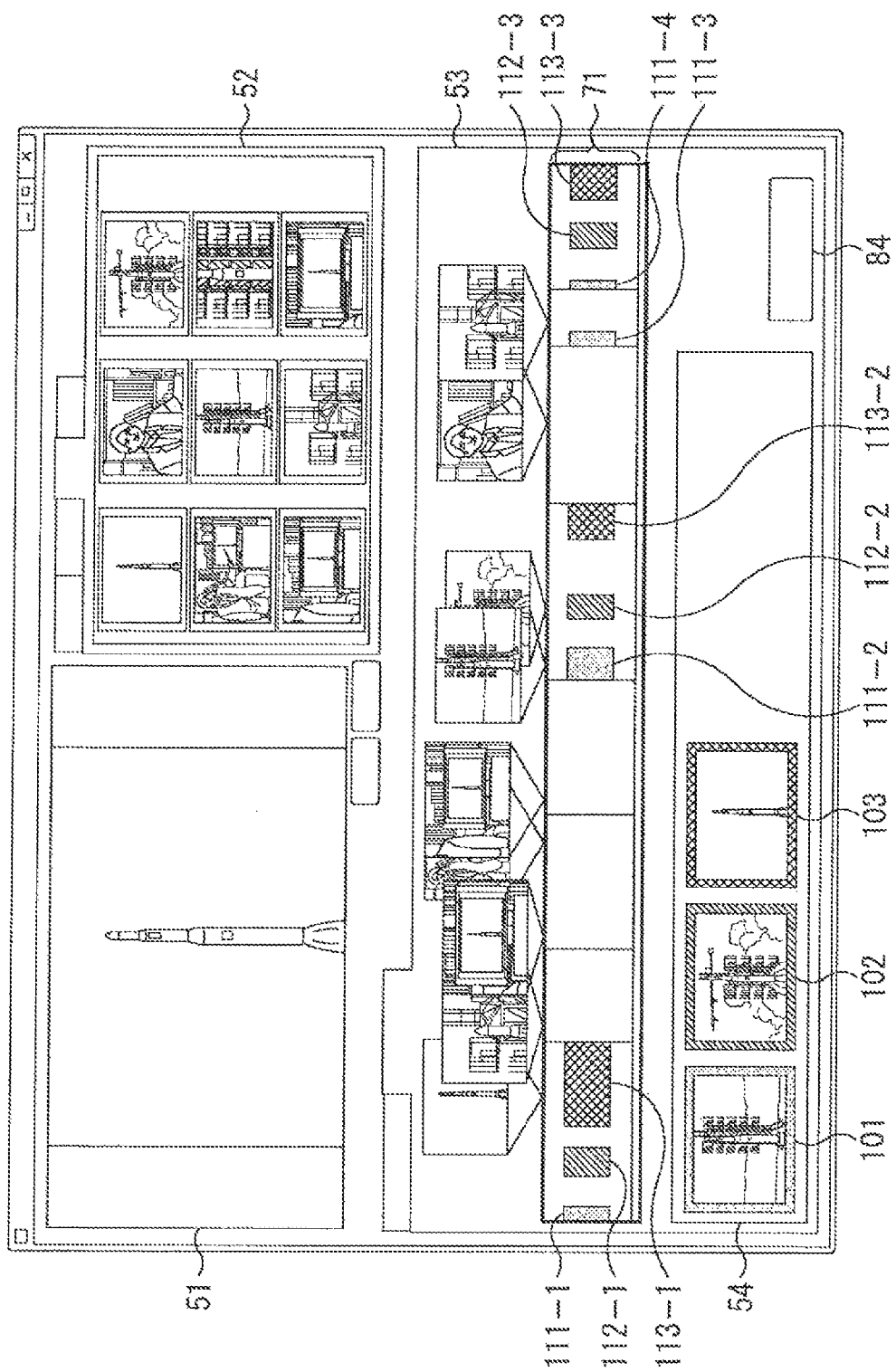
FIG. 7 is a diagram illustrating an exemplary screen on which retrieval results have been displayed on the screen shown in FIG. 6.

FIG. 7 is a diagram illustrating an example of the screen in which the button 84 is operated on the screen shown in FIG. 6 and retrieval results are displayed.

As shown in FIG. 7, outer frames (display frame) of the images 101 to 103 displayed on the retrieval image display region 54 are displayed in a predetermined color. In addition, in the figure, a predetermined color is displayed with a difference in the hatching pattern. For example, the outer frame of the image 101 is displayed in blue, and the outer frame of the image 102 is displayed in green, and the outer frame of the image 103 is displayed in red.

In addition, in an example of FIG. 7, a color bar for expressing the position of the frame of the imago similar to each of the images 101 to 103 is displayed in an overlapped manner with the rectangle corresponding to each scene of the scene display region 71. In addition, the color bar shown in FIG. 7 is a bar which shows a plurality of frame positions and has a predetermined width horizontally in the figure. In other words, in a case where a still image is retrieved in the content of the moving image, a plurality of images having a high similarity degree is usually detected in succession. Therefore, if color is imparted to each frame position of images of a high similarity degree, color bars are displayed.

In the figure, color bars 111-1 to 111-4 express the positions of each frame of images having a high similarity degree to the image 101, and have the same color (for example, blue) as color of an outer frame of the image 101. In addition, color bars 112-1 to 112-3 express the positions of each frame of images having a high similarity degree to the image 102 and have the same color (for example, green) as color of an outer frame of the image 102. In addition, color bars 113-1 to 113-3 express the positions of each frame of images having high similarity degree to the image 103 and have the same color (for example, red) as color of an outer frame of the image 103.

In this manner, a user can understand, at a glance, where and by what length a portion displaying a target image (retrieval image) exists in content. Furthermore, the user can also understand, at a glance, how respective portions displaying a plurality of images (for example, the images 101 to 103) are combined in content.

For example, in the example of FIG. 7, the images 101 to 103 are each an image of the missile. The image 101 is an image before missile launch, the image 102 is an image at the time of the missile launch, and the image 103 is an image after the missile launch. For example, images before missile launch, at the time of the missile launch, and after the missile launch are often displayed repeatedly when the news about the missile is reported in the content such as news programs.

According to the retrieval results shown in FIG. 7, it is understood that the content includes about four portions displaying the image of the missile.

The first portion is a scene corresponding to the leftmost rectangle of the scene display region 71. In other words, the user knows that the images of the missile had been displayed in this portion because images before missile launch, at the time of the missile launch, and after the missile launch are displayed in portions corresponding to the color bar 111-1, the color bar 112-1 and the color bar 113-1.

The second portion is a fifth scene corresponding to the fifth rectangle from the left of the scene display region 71. In other words, the user knows that the images of the missile had been displayed in this portion because images before missile launch, at the time of the missile launch, and after the missile launch are displayed in portions corresponding to the color bar 111-2, the color bar 112-2 and the color bar 113-2.

The third portion is a seventh scene corresponding to the seventh rectangle from the left of the scene display region 71. In other Words, the user knows that the image of the missile had been displayed in this portion because an image before the missile launch is displayed in a portion corresponding to the color bar 111-3.

The fourth portion is an eighth scene corresponding to the eighth rectangle from the left of the scene display region 71. In other words, the user knows that the images Of the missile had been displayed in this portion because images before missile launch, at the time of the missile launch, and after the missile launch are displayed in portions corresponding to the color bar 111-4, the color bar 112-3 and the color bar 113-3.

In other words, although the user understands that there are four scenes about the missile in the content concerned, and that only the seventh scene is showing only an image before the launch unlike other scenes. In addition, in the first scene, unlike other scenes, the user understands that an image after the launch is displayed for a long time.

In this way, if retrieval results are used by the content processing apparatus 10 of the invention, the user can understand the details of content at a glance and, for example, evaluate the editing technique of the editor of the content concerned.

In addition, also in screens shown in FIGS. 6 and 7, similar to the above-described case, it is possible to replay the content and to display moving images in the moving image display region 51.

Here, in the same screens as those of FIGS. 2 to 4, an example where a retrieval is performed has been described, but when the retrieval of an image is performed, ether screens may be displayed. It is important that a screen having the retrieval image display region 54 of FIG. 7 and the timeline display region 53 is displayed.

In FIG. 7, an example of retrieving the image about one piece of content has been described, but images about a plurality of pieces of content may be retrieved.

Figure 8:
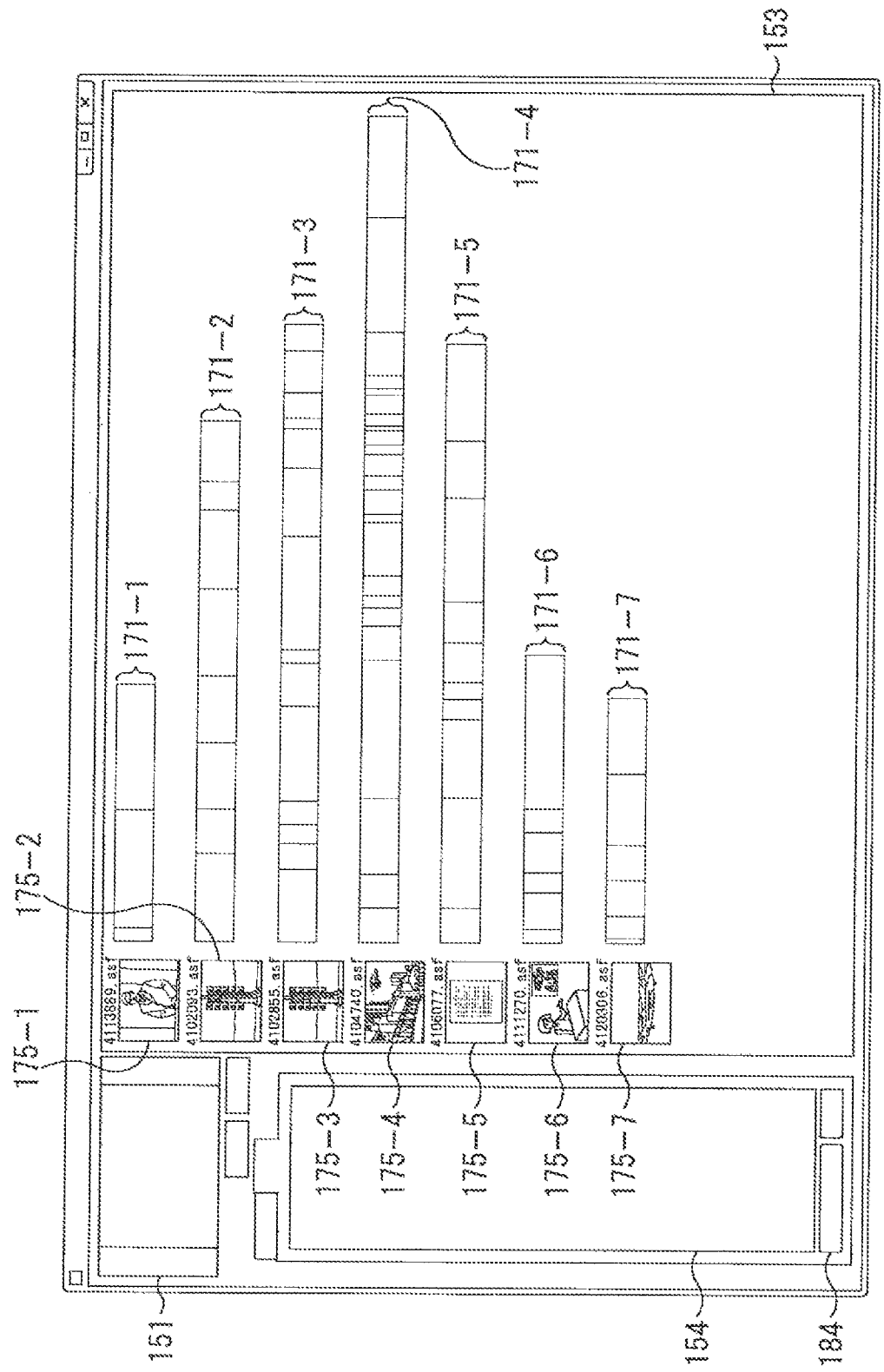
FIG. 8 is a diagram illustrating an exemplary screen in a case where a plurality of pieces of content is retrieved.

FIG. 8 is a diagram illustrating an example of a screen displayed by display data generated by the output unit 28 of the content processing apparatus 10 of FIG. 1 when images about a plurality of pieces of content are retrieved.

In addition, it is assumed that when images about a plurality of pieces of content are retrieved, the input of a plurality of pieces of content has been received in advance by the content input unit 21 of FIG. 1 and, for each content, the extraction of metadata and extraction of image feature quantity have been done. In addition, it is assumed that when images about a plurality of pieces of content are retrieved, for example, the metadata stored in the metadata database 24 and the image feature quantity stored in the image feature quantity database based on the identification information of content can be read.

On a screen of FIG. 8, a moving image display region 151, a timeline display region 153, a retrieval image display region 154 are provided. In the example of FIG. 8, on the timeline display region 153, seven pieces of content are displayed in the timeline.

On the timeline display region 153, the scene display regions corresponding to the number of content targeted for the retrieval are provided. In this example, on the timeline display region 153, the scene display regions 171-1 to 171-7 are provided.

On each of the scene display regions 171-1 to 171-7, each scene of each of content is displayed as a rectangle having a width (length) corresponding to the time length of each scene. For example, on the scene display region 171-1, three rectangles are displayed, and it can be understood that the content is constructed with three scenes. In addition, the start point and the termination point of each scene are specified based on information of the scene change point included in the metadata read from the metadata database 24, and rectangles of the scene display regions 171-1 to 171-7 are displayed as the start and termination points.

Each rectangle indicated in each of the scene display regions 171-1 to 171-7, for example, is displayed in representative color of the scene (but displayed all in white for convenience in the figure). For example, the representative color of the scene is specified as color corresponding to the most pixel value in pixel values of all frames in the scene. Note that a representative color of the scene may be specified by other methods as long as a color suitable for the impression of the scene is set as the representative color.

In addition, in the timeline display region 153, on the left side of the scene display regions 171-1 to 171-7 in the figure, still image display regions 175-1 to 175-7 are provided. It is assumed that each of images displayed on the still image display regions 175-1 to 175-7 is, for example, an image of the leading frame of each of content, a predetermined representative image or the like. In addition, it is assumed that each of character strings described on the upper side of the images displayed in the still image display regions 175-1 to 175-7 is, for example, identification information of each content.

On the moving image display region 151, a moving image, which is provided by content selected and replayed by a user among content displayed in the timeline on the timeline display region 153, is displayed.

On the retrieval image display region 154, the retrieval image that has been received as input by the retrieval image input unit 26 is displayed. In addition, in the example of FIG. 8, the retrieval image is not yet input, and the retrieval image is not displayed on the retrieval image display region 154. The retrieval image, for example, is assumed to be the image arbitrarily selected by a user, and is input to retrieve an image similar to the retrieval image concerned among content displayed in the timeline on the timeline display region 153.

In this State, when the retrieval image is input and the button 184 configured as a component of the GUI is operated, an image having a high similarity degree to the image displayed in the retrieval image display region 154 is retrieved from among the content.

Figure 9:
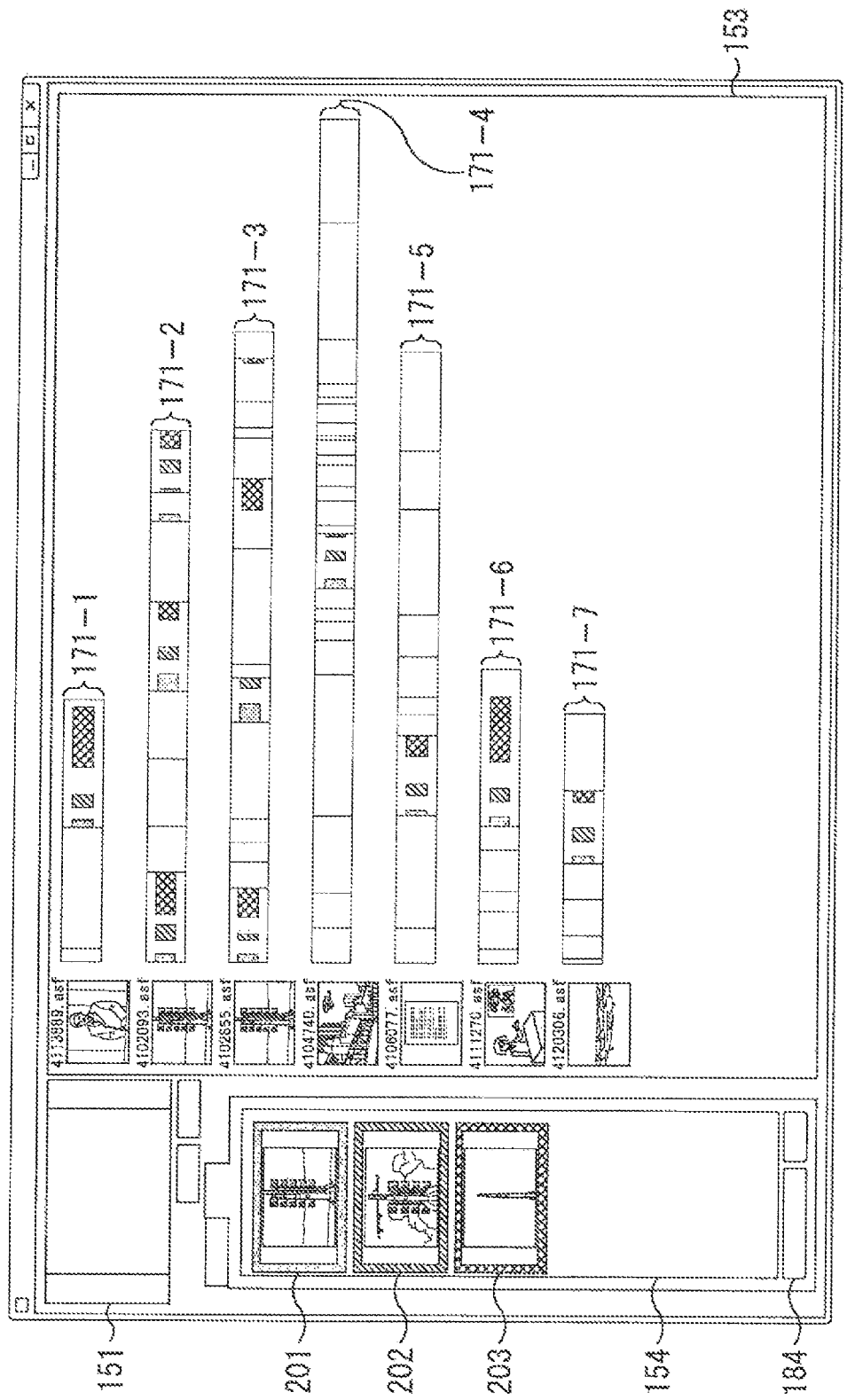
FIG. 9 is a diagram illustrating an exemplary screen on which retrieval results have been displayed in the screen shown in FIG. 8.

FIG. 9 shows an example of a screen when images 201 to 203 are input as retrieval images and the button 184 is operated, whereby retrieval results are displayed on the screen shown in FIG. 8.

As shown in FIG. 9, the outer frames of the images 201 to 203 which are displayed on the retrieval image display region 154 are displayed in predetermined colors. In addition, in the figure, the predetermined colors are displayed with a difference in the hatching pattern.

In addition, in an example of FIG. 9, color bars expressing positions of the frames of the images similar to the images 201 to 203 are displayed in an overlapped manner with the rectangle corresponding to each scene of the scene display regions 171-1 171-7. In addition, it is assumed that the color bars shown in FIG. 9, similar to the case mentioned above with reference to FIG. 7, indicate a plurality of frame positions and have a predetermined width horizontally in the figure. In other words, when retrieving a still image in the content of the moving image, a plurality of images having a high similarity degree is usually detected in succession. Therefore, color bars will be displayed with color imparted to the frame position of the image with a high similarity degree.

In the figure, a color bar 211 indicates a position of the frame of an image having a high similarity degree to the image 201 and has the same color (for example, blue) as the outer frame of the image 201. In addition, a color bar 212 indicates the position of the frame of an image having a high similarity degree to the image 202 and has the same color (for example, green) as the Outer frame of the image 202. Furthermore, a color bar 213 indicates the position of the frame of an image having a high similarity degree to the image 203 and has the same color (for example, red) as the outer frame of the image 203.

Note that, in the example of FIG. 9, a reference sign is given only to the color bar displayed in the scene display region 171-1, but color bars are displayed also in the scene display regions 171-2 to 171-7. In other words, in the example of FIG. 9, the retrieval results similar to that of the case mentioned above with reference to FIG. 7 can be obtained for each of a plurality of pieces of content (in this example, seven).

In this manner, a user can understand, at a glance, where and by what length portions displaying a target image (retrieval image) exist in a plurality of pieces of content. Furthermore, a user can understand, at a glance, bow respective portions displaying a plurality of images (for example, the images 101 to 103) combined in a plurality of pieces of content. By displaying those retrieval results on one screen, for example, it is possible to compare the editing details of the respective pieces of content with each other.

Figure 10:
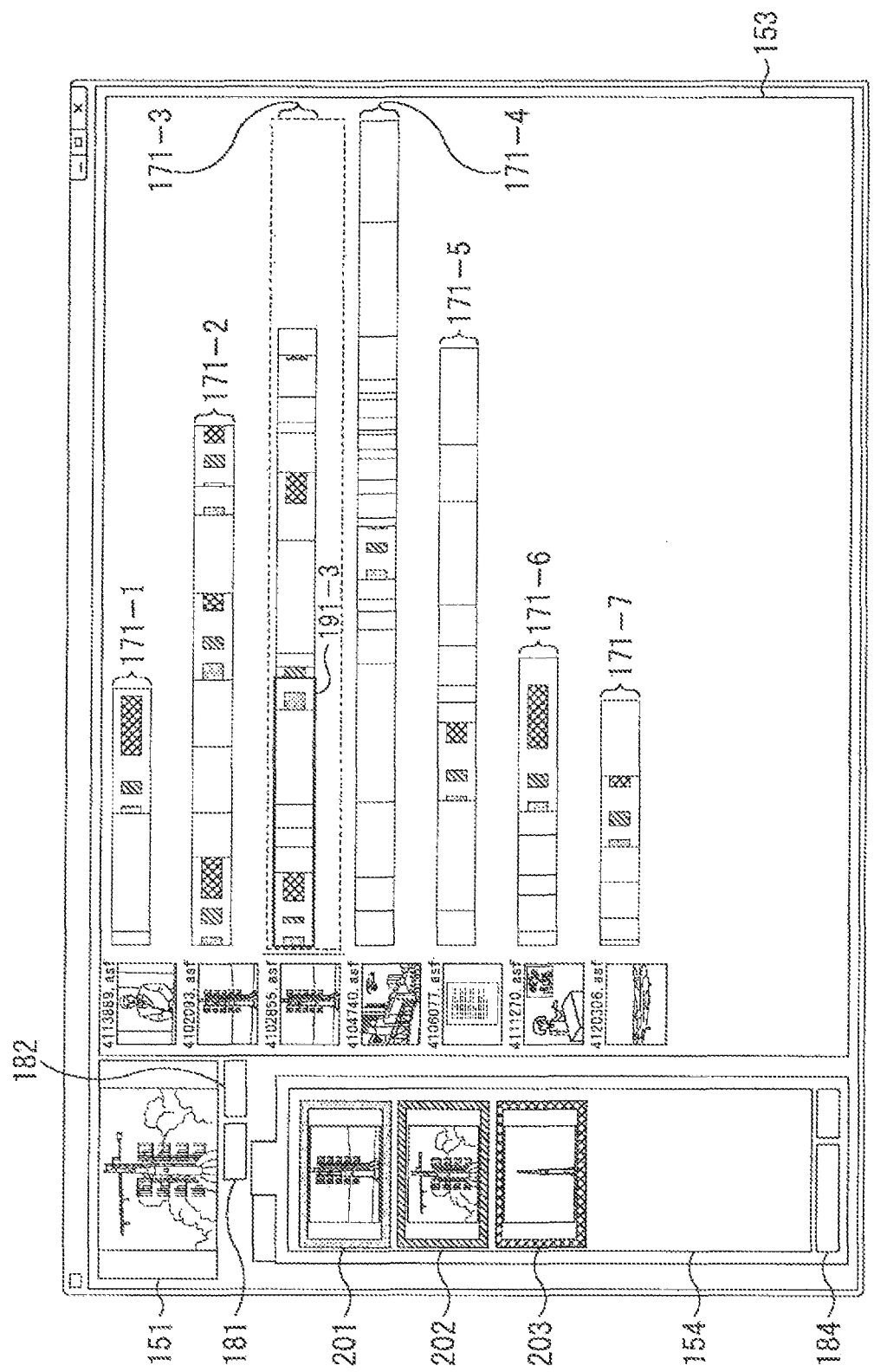
FIG. 10 is a diagram illustrating an exemplary screen of when content is replayed on the screen shown in FIG. 9

Furthermore, as described above, on the moving image display region 151, the moving image of content selected and replayed by a user, among content displayed in the timeline in the timeline display region 153, is displayed. FIG. 10 is a diagram illustrating an example of the screen of when the moving image is displayed on the moving image display region 151. The example of FIG. 10 shows that a user has selected the scene display region 171-3 using a pointing device or the like (not shown) and operated the button 181 to replay the content concerned.

In addition, the button 181 constituted as a GUI is a button to replay content and cause the moving image display region 151 to display a moving image. The button 182 is a button to stop the replay of the content. In addition, in the example of the figure, as the scene display region 171-3 has been selected, the surroundings of the scene display region 171-3 are displayed to be highlighted. In this example, the surroundings of the scene display region 171-3 are displayed to be highlighted by being indicated in a dotted line.

Furthermore, when replaying content with the button 181, the position of a frame replayed at present time point is shown by the slider on the timeline display region 153. In the example of the figure, the slider 191-3 is displayed because content of the scene display region 171-3 is replayed.

The slider 191-3, for example, is the red quadrangular frame which is displayed while being overlapped on the scene display region 171-3 and, with a lapse of time, the horizontal length thereof in the drawing increases. The right, end of the slider 191-3 will express the current replay position of content. The right end of the slider 191-3 has moved to the right side on the scene display region 171-3 since a predetermined time has passed after content is replayed.

Note that, in the example of FIG. 10, the slider 191-3 is displayed because content of the scene display region 171-3 is replayed. When other content is replayed, the slider will be displayed on the scene display region of the content.

In this manner, along with the display of the retrieval results, it is possible to replay content and display a moving image.

Figure 11:
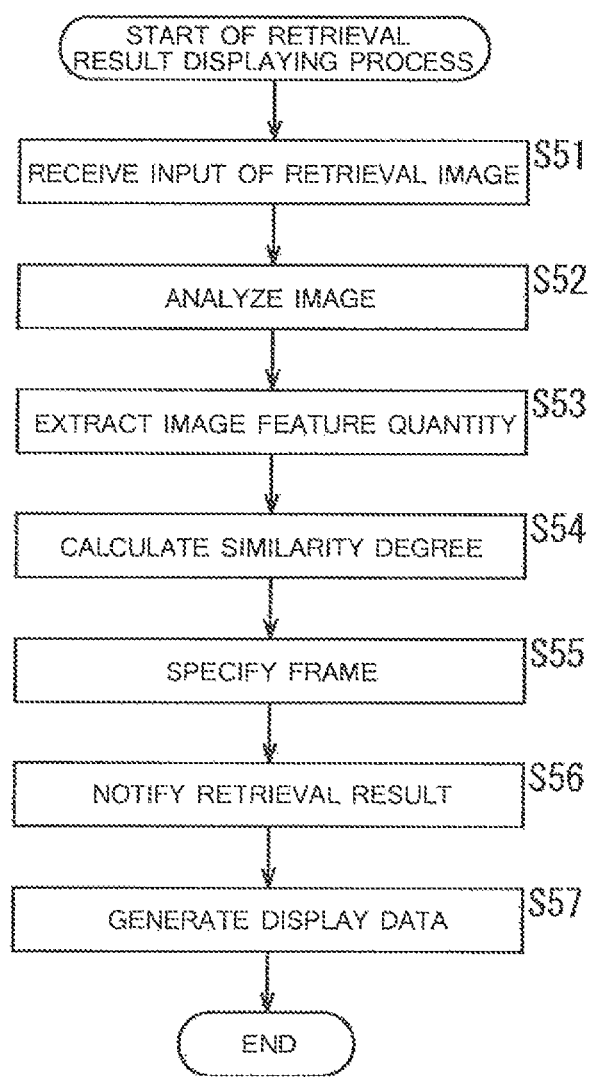
FIG. 11 is a flowchart for explaining the displaying process of the retrieval results.

Next, with reference to the flowchart of FIG. 11, an example of the retrieval result displaying process by the content processing apparatus 10 of FIG. 1 will be described. Ahead of this process, input of single or a plurality of pieces of content has been received in advance by the content input unit 21, and for each content, the extraction of the metadata and the extraction of the image feature quantity have been performed.

In step S51, the retrieval image input unit 26 receives the input of the retrieval image. Here, the retrieval image, for example, is an image (still image) arbitrarily selected by user and is input to retrieve an image similar to the retrieval image concerned from among content input from the content input unit 21. At this time, for example, the images 101 to 103 of FIG. 6 are input as retrieval images.

In step S52, the image feature quantity extracting unit 23 analyzes the retrieval image input in step S51.

In step S53, the image feature quantity extracting unit 23 extracts the image feature quantity of the retrieval image as a result of the process of step S51.

In step S54, the retrieving unit 27 compares the image feature quantity of a retrieval image extracted by the image feature quantity extracting unit 23 by the process in step S53 with the image feature quantity stored in the image feature quantity database 25 by a predetermined method. In this manner, a similarity degree between the image feature quantity of the retrieval image and each image feature quantity of the still image for one frame constituting content stored in the image feature quantity database 25 is calculated as a numerical value.

In step S55, the retrieving unit 27, for example, specifies the frame of the still image where the similarity degree to the image feature quantity of the retrieval image has a value equal to or more than the predetermined threshold.

In step S56, the retrieving unit 27 notifies the output unit 28 of retrieval results. At this time, the frame numbers and the like of a still image specified as a result of the process of step S55 are supplied to the output unit 28.

In step S57, the output unit 28 reads the metadata of content from the metadata database 24 and generates the display data for a timeline to display retrieval results based on the frame number of a still image supplied by the process in step S56 and the read metadata. In this way, for example, the screen as mentioned above with reference to FIG. 7 or FIG. 9 is displayed.

Thereafter, in response to operation of GUI on the screen, the output unit 28 generates appropriate display data.

In this way, the displaying process for the retrieval results is performed.

By referring to a screen obtained as a result of the retrieval result displaying process mentioned above, it is possible to understand, at a glance, where and by what length a portion displaying a target image (retrieval image) exists in content. Along with it, by referring to a screen obtained as a result of the retrieval result displaying process mentioned above, occurrence of a predetermined event in content can be detected.

For example, by retrieving a plurality of retrieval images and distinguishing the detected order of the frame similar to those retrieval images, it becomes possible to roughly recognize what kind of event has occurred in which portion of content.

Figure 12:
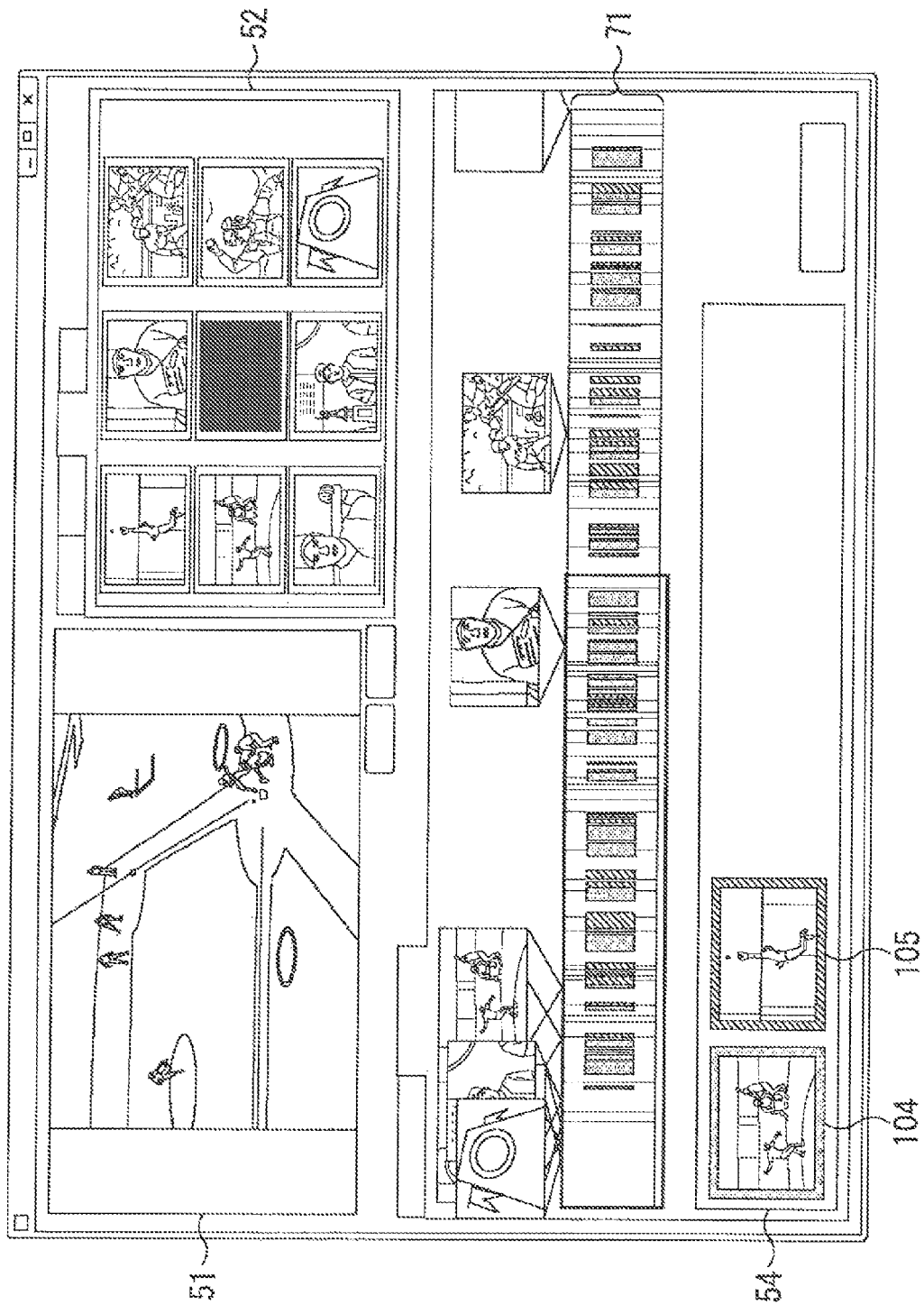
FIG. 12 is a diagram illustrating another example of a screen on Which the retrieval results have been displayed.

FIG. 12 is, similar to the screen mentioned above with reference to FIG. 7, a diagram illustrating an example of a screen displaying the result obtained by retrieving retrieval images about certain content. In this example, the content of the program of the baseball broadcast are retrieved and displayed in timeline.

In the example of FIG. 12, images 104 and 105 are displayed on the retrieval image display region 54. In this example, from among the nine representative images displayed On the representative image display region 52, two representative images are selected and set as retrieval images.

In addition, the outer frames of the images 104 and 105 displayed on the retrieval image display region 54 are displayed in predetermined colors. For example, the outer frame of the image 104 is displayed in blue, and the outer frame of the image 105 is displayed in green. Note that, in the drawing, the predetermined colors are displayed with a difference in the hatching pattern.

Furthermore, in the example of the figure, a color bar for expressing the position of the frame of the image similar to each of the images 104 and 105 is displayed while being overlapped with the rectangle corresponding to each scene of the scene display region 71. Note that each of the color bars shown in FIG. 12 is a color bar having the same color as the outer frame of the image 104 or the outer frame of the image 105.

In the example of FIG. 12, the image 104 is an image of when a pitcher throws a ball, and the image 105 is an image of when an outfielder runs (jumping toward a ball) Therefore, on the scene display region 71, a color bar expressing the frame of the image similar to the image 104 is displayed, and on the right side thereof, it can be known that the batted ball flew to the outfield in the portion where a color bar expressing the frame of an image similar to image 105 is displayed.

In addition images 104 and 105, for example, if an image 106 of the runner on the first base is retrieved and the portion where the color bars of the images similar to the images 104, 105 and 106 appear continuously in turn is found, it can be known on the portion that a batter has hit a single.

In addition to the images 104 and 105, for example, if an image 107 of the runner on the second base is retrieved and the portion where the color bars of the images similar to the images 104, 105 and 107 appear continuously in turn is found, it can he known on the portion that a batter has hit a double.

Then, for example, with reference to each rectangle (each scene) and thumbnail displayed thereon which are displayed in the scene display region 71, it becomes possible to more easily understand the details of content.

In this way, by combining the images of throwing a ball, defense, and base running together as retrieval images, it becomes possible to easily look in which portion of content a single has been hit and in which portion the content a double has been hit. In other words, by retrieving a plurality of retrieval images appropriately in combination and identifying the temporal positions where the frames similar to such retrieval images have been detected or the detected order thereof, it becomes possible to recognize what kind of event has occurred in which portion of content.

In this way, according to the invention, the visualized display of the details of the content that has not been possible in the related art can be realized. Thus, it is possible to grasp more easily the details of the content of the moving image.

In addition, by retrieving in combination a plurality of retrieval images appropriately, and displaying frames similar to such retrieval images, for example, it also becomes possible to evaluate the content of the program before the broadcast in advance.

For example, it is assumed that there is a need to include images of a product a of a program sponsor A, a product b of a program sponsor B and a product c of a program sponsor C in content. In such a case, by retrieving the product a to the product c and comparing the length of the color bars of the frames similar to those retrieval images, it is possible to correct a bias of the program sponsor A to the program sponsor C. In a case where there is a difference in the quantity of investment among the program sponsor A to the program sponsor C, the intention of the program sponsor can appropriately be reflected in the content by retrieving images of the product a to the product c, and comparing the length and the, order of the color bars of frames similar to those retrieval images.

In this way, according to the invention, the comparison of the details of the content that has been impossible in the related art is enabled. Thus, it is possible to more easily grasp the details of the content of the moving image.

Note that, in the above, content is displayed in the timeline with the horizontal direction in the drawing corresponding to the time axis on a display screen by the content processing apparatus 10, but content may he displayed in the timeline with the vertical direction in the drawing corresponding to the time axis.

Note that the series of processing mentioned above may be performed by either hardware or software. In a case where the series of processing mentioned above is carried out by software, a program constituting the software is installed in a computer incorporated in dedicated hardware from a network or a recording medium. Alternatively, the program is installed in, for example, a general-purpose personal computer 700 as shown in FIG. 13 from a network or a recording medium, the personal computer 700 being capable of executing various functions by installing various programs.

Figure 13:
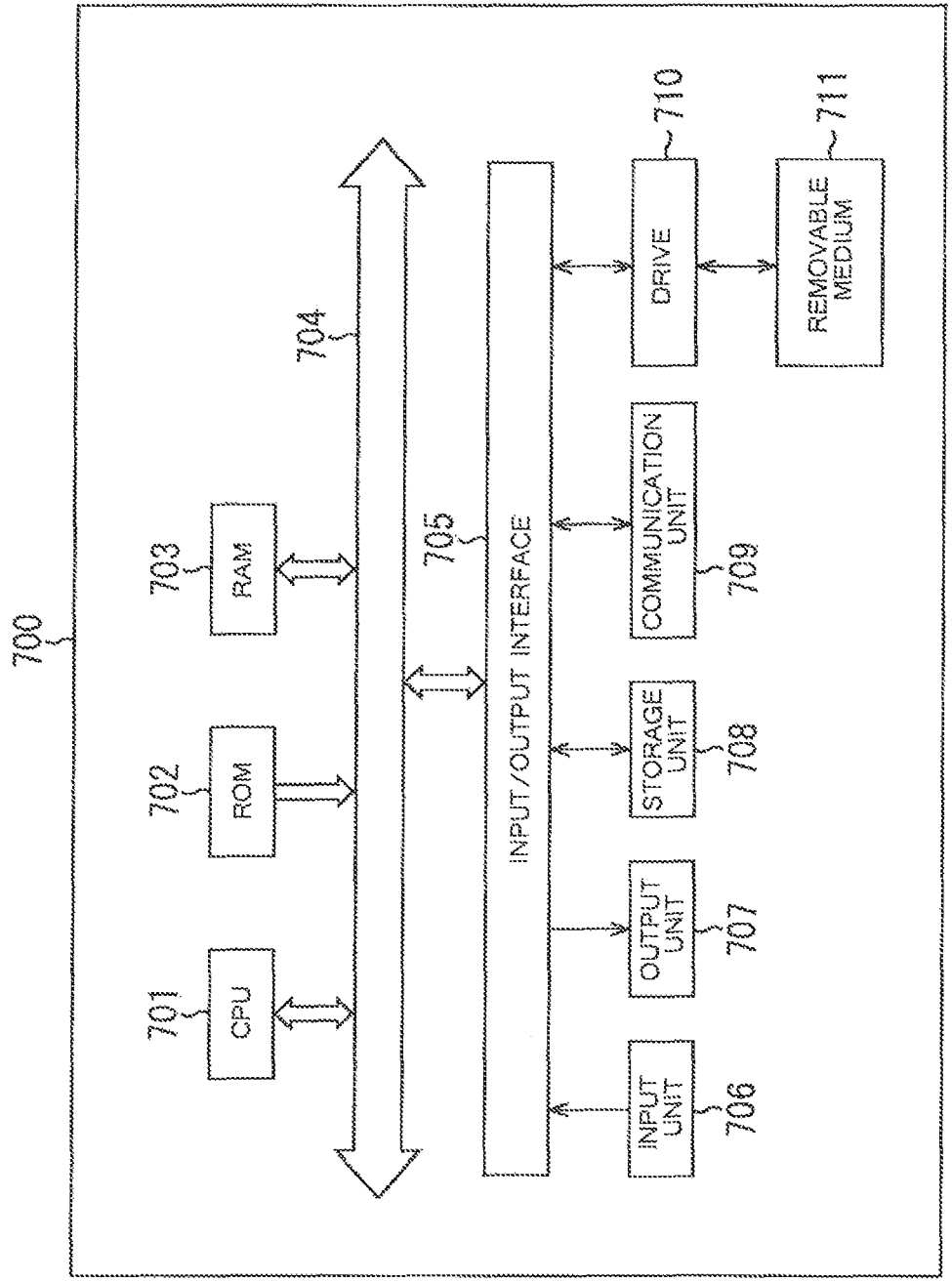
FIG. 13 is a block diagram illustrating an exemplary configuration of a personal computer.

In FIG. 13, a CPU (Central Processing Unit) 701 carries out various processing according to a program stored in a ROM (Read Only Memory) 702 or a program loaded to a RAM (Random Access Memory) 703 from a storage unit 708. In the RAM 703, data necessary for the CPU 701 to carry out various processing and the like are also stored appropriately.

The CPU 701, the ROM 702 and the RAM 703 are connected mutually through a bus 704. An input/output interface 705 is also connected to the bus 704.

An input unit 706 including a keyboard, a mouse and the like and an output unit 707 including a display such as an LCD (Liquid Crystal display) a speaker and the like are connected to the input/output interface 705. In addition, a storage unit 708 constructed by a hard disk and the like, and a communication unit 709 constructed by a network interface card such as a modem or LAN card are connected to the input/output interface 705. The communication unit 709 performs the communication processing through the network including the Internet.

A drive 710 is connected to the input/output interface 705 as necessary, and a removable medium 711 such as a magnetic disk, an optical disk, a magneto-optical disk or a semiconductor memory is installed to the drive 710 appropriately. Furthermore, a computer program read from those removable media is installed in the storage unit 708 as necessary.

When carrying out the series of processing mentioned above by software, a program constituting the software is installed from a network such as the Internet or a recording medium such as the removable medium 711 and the like.

Note that this recording medium includes, separately from the main body of device shown in FIG. 13, not only the removable medium 711 such as a magnetic disk (including floppy disk (registered trademark)), an optical disk (including CD-ROM (Compact Disk-Read Only Memory) and a DVD (Digital Versatile Disk)), a magneto-optical disk (including MD (Mini-Disk) (registered trademark)), or a semiconductor memory which is distributed to deliver a program to a user and in which the program has been recorded, but also a ROM 702 which is delivered to a user while being incorporated in the device main body in advance and in which the program has been recorded, and a hard disk included in the storage unit 708.

Note that the series of processing mentioned above in this specification may include a process performed in time-series according to the listed order as welt as a process performed in parallel or individually even though it is not necessarily processed in time-series according to the listed order.

In addition, the embodiment of the invention is not limited to the embodiment mentioned above, and various kinds of modifications shall be possible within a range that does not deviate from the spirit of the invention.

REFERENCE SIGNS LIST

10 Content processing apparatus
21 Content input unit
22 Metadata extracting unit
23 Image feature quantity extracting unit
24 Metadata database
25 Image feature quantity database
26 Retrieval image input unit
27 Retrieving unit
28 Output unit

The invention claimed is:

1. A content processing apparatus comprising:
 a metadata extracting unit configured to extract metadata from content of a moving image, the metadata including information identifying scene change points of the content;
 an image extracting unit configured to extract from the moving image representative images which are still images corresponding to the identified scene change points of the content;
 a still image display configured to display in a predetermined thumbnail display area an array of particular extracted still images corresponding to the representative images at the identified scene change points; and
 a timeline display configured to display a timeline of the content and including a scene display region for displaying plural representations of temporal length and locations of respective plural scenes identified by the scene change points of the content, the timeline display displaying thumbnail images of the extracted still images that are displayed in the thumbnail display area, juxtaposed at time positions along the content timeline indicating the locations in the moving image content of a respective still image, the scene display region further displaying identifying characteristics within the plural representations of the respective plural scenes that identify the locations of those corresponding thumbnail images within the plural scenes, and when the content is instructed to be replayed a slider representing the position of the content then being replayed is displayed on a time axis of the timeline for specifying a position in the scene of a frame of the content being replayed, and wherein a predetermined display characteristic of the displayed thumbnail image in the timeline display that corresponds to an image included in the scene being replayed at the specified position of the slider is changed to visually identify the image in the content that is then being replayed.

2. The content processing apparatus according to claim 1, wherein the identifying characteristic is a color representing the scene specified by a predetermined method to display the content in the timeline.

3. The content processing apparatus according to claim 2, wherein the timeline display includes a screen to display the moving image at a predetermined position of the screen.

4. The content processing apparatus according to claim 3, wherein the timeline display generates display data for displaying on the screen a representative image display region for displaying a list of the representative images, and a moving image display region for displaying the moving image of the replayed content.

5. A non-transitory computer readable medium on which is recorded a program that, when read, controls a computer to operate as a content processing apparatus comprised of:
   a metadata extracting unit that extracts metadata from content of a moving image, the metadata including information identifying scene change points of the content;
   an image extracting unit for extracting from the moving image representative images which are still images corresponding to the identified scene change points of the content;
   a still image display unit for displaying in a predetermined thumbnail display area an array of particular extracted still images corresponding to the representative images at the identified scene change points; and
   a timeline display unit for displaying a timeline of the content and including a scene display region for displaying plural representations of temporal length and locations of respective plural scenes identified by the scene change points of the content, the timeline display means displaying thumbnail images of the extracted still images that are displayed in the thumbnail display area, juxtaposed at time positions along the content timeline indicating the locations in the moving image content of a respective still image, the scene display region further displaying identifying characteristics within the plural representations of the respective plural scenes that identify the locations of those corresponding thumbnail images within the plural scenes, and when the content is instructed to be replayed a slider representing the position of the content then being replayed is displayed on a time axis of the timeline for specifying a position in the scene of a frame of the content being replayed, and wherein a predetermined display characteristic of the displayed thumbnail image in the timeline display that corresponds to an image included in the scene being replayed at the specified position of the slider is changed to visually identify the image in the content that is then being replayed.

6. A content processing method comprising:
   extracting metadata from content of a moving image, the metadata including information identifying scene change points of the content;
   extracting from the moving image representative images which are still images corresponding to the identified scene change points of the content;
   displaying in a predetermined thumbnail display area an array of particular extracted still images corresponding to the representative images at the identified scene change points; and
   displaying display data representing a timeline of the content including a scene display region for displaying plural representations of temporal length and locations of respective plural scenes identified by the scene change points of the content, and to display thumbnail images of the extracted still images that are displayed in the thumbnail display area juxtaposed at time positions along the content timeline indicating the locations in the moving image content of a respective still image, the scene display region further displaying identifying characteristics within the plural representations of the respective plural scenes that identify the locations of those corresponding thumbnail images within the plural scenes, and when the content is replayed, to cause the display of a slider representing the position of the content then being replayed on a time axis of the timeline for specifying a position in the scene of a frame then being replayed in that content, and to change a predetermined display characteristic of the displayed thumbnail image in the timeline display that corresponds to an image included in the scene being replayed at the specified position of the slider to visually identify the image in the content that is then being replayed.

\* \* \* \* \*